(12) United States Patent
Spinella

(10) Patent No.: US 9,762,074 B2
(45) Date of Patent: *Sep. 12, 2017

(54) METHOD AND APPARATUS FOR TRANSFERRING ELECTRICAL POWER

(71) Applicant: EGGTRONIC S.R.L., Modena (IT)

(72) Inventor: Igor Spinella, Modena (IT)

(73) Assignee: EGGTRONIC ENGINEERING S.R.L., Modena (IT)

(*) Notice: Subject to any disclaimer, the term of this patent is extended or adjusted under 35 U.S.C. 154(b) by 0 days.

This patent is subject to a terminal disclaimer.

(21) Appl. No.: 14/949,695

(22) Filed: Nov. 23, 2015

(65) Prior Publication Data

US 2016/0087473 A1    Mar. 24, 2016

Related U.S. Application Data

(62) Division of application No. 14/389,507, filed as application No. PCT/IB2013/000464 on Mar. 19, 2013, now Pat. No. 9,209,674.

(30) Foreign Application Priority Data

Apr. 2, 2012   (IT) .............. RE2012A0021

(51) Int. Cl.
| H02M 3/335 | (2006.01) |
| H02J 7/00 | (2006.01) |
| H02M 3/00 | (2006.01) |
| H02M 3/338 | (2006.01) |
| H02M 1/08 | (2006.01) |
| H02J 7/02 | (2016.01) |
| H02M 1/00 | (2006.01) |

(52) U.S. Cl.
CPC ............ *H02J 7/0052* (2013.01); *H02J 7/007* (2013.01); *H02M 1/08* (2013.01); *H02M 3/005* (2013.01); *H02M 3/3385* (2013.01); *H02M 3/33507* (2013.01); *H02J 7/025* (2013.01); *H02M 2001/0048* (2013.01)

(58) Field of Classification Search
CPC ...... H02M 3/005; H02M 3/3385; H02M 1/08; H02M 3/33507; H02J 7/0052; H02J 7/007; H02J 7/025
USPC ..... 363/16–20, 21.01, 21.09, 34–41, 46, 89, 363/97, 131; 323/207, 208, 222, 225, 323/266, 271, 282–290
See application file for complete search history.

(56) References Cited

U.S. PATENT DOCUMENTS

| 4,184,197 A | 1/1980 | Cuk et al. |
| 4,607,323 A | 8/1986 | Sokal et al. |
| 4,635,175 A | 1/1987 | Probst |

(Continued)

FOREIGN PATENT DOCUMENTS

| CA | 2431689 A1 | 12/2004 |
| DE | 2508314 A1 | 9/1976 |

(Continued)

*Primary Examiner* — Rajnikant Patel
(74) *Attorney, Agent, or Firm* — Volpe and Koenig, P.C.

(57) ABSTRACT

A method and an apparatus for transferring electric power to an electrical load (105); the method includes steps of: converting a direct electric current into an electric tension wave, applying the electric tension wave in inlet to at least a couple of electric capacitors (125, 130); supplying the electrical load (105) with the electric tension in outlet from the capacitors (125, 130).

22 Claims, 4 Drawing Sheets

(56) References Cited

U.S. PATENT DOCUMENTS

| | | | |
|---|---|---|---|
| 5,060,252 A * | 10/1991 | Vogler | H05G 1/66 378/101 |
| 5,396,165 A * | 3/1995 | Hwang | G05F 1/70 323/210 |
| 5,583,421 A | 12/1996 | Barbehenn | |
| 6,301,128 B1 | 10/2001 | Jang | |
| 6,483,281 B2 * | 11/2002 | Hwang | H02M 3/158 323/299 |
| 6,605,930 B2 * | 8/2003 | Hwang | H02M 3/158 323/225 |
| 6,844,702 B2 | 1/2005 | Giannopoulos | |
| 7,110,268 B2 | 9/2006 | Yasumura | |
| 7,170,761 B2 | 1/2007 | Yasumura | |
| 7,317,301 B2 * | 1/2008 | Angquist | H02J 11/00 307/45 |
| 7,345,893 B2 | 3/2008 | Boldo | |
| 8,564,978 B2 | 10/2013 | Keller | |

FOREIGN PATENT DOCUMENTS

| | | |
|---|---|---|
| EP | 0087593 A2 | 9/1983 |
| WO | 0180411 A1 | 10/2001 |
| WO | 2011043074 A1 | 4/2011 |

\* cited by examiner

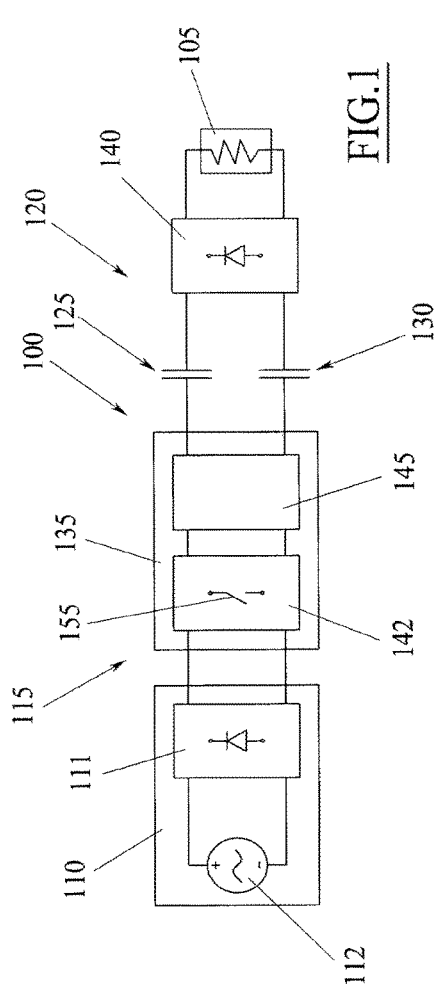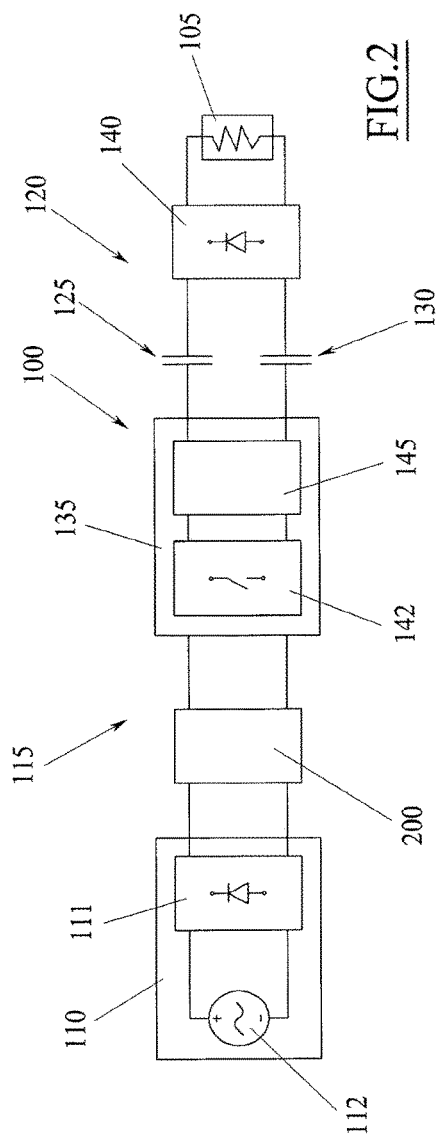

METHOD AND APPARATUS FOR TRANSFERRING ELECTRICAL POWER

CROSS REFERENCE TO RELATED APPLICATIONS

This application is a division of U.S. patent application Ser. No. 14/389,507, filed Sep. 30, 2014, which is a 371 U.S. National Phase of PCT/IB2013/000464 filed Mar. 19, 2013, which are incorporated by reference as if fully set forth.

FIELD OF THE INVENTION

The present invention relates in general to a method and an apparatus for transferring electrical power to an electrical load. The electrical load can be for example any electrical or electronic device which has to be electrically powered in order for it to function and/or to charge the internal batteries of the device. Classic examples of this type of electric/electronic device are cellular telephones, computers, televisions and the like.

BACKGROUND

A solution that is at present very widely used for transferring electric power to a charging device is that of using an AC/DC converter able to convert an alternating current (AC), generated for example by a common electric grid, into a direct current (DC) suitable for supplying the charging device.

To realize an AC/DC converter capable of transferring high electric power to the charging device, with high performance, low encumbrance and low costs, a circuit is generally used having some typical characteristics.

The circuit comprises, firstly, a high-tension rectifier, normally a diode bridge rectifier having possibly a tension and/or current stabilization circuit, which is connectable to the electrical grid, normally by means of an electric plug, such as to convert alternating current supplied by the electrical grid into a direct current. The high tension continues in output from the rectifier thus applied to a DC/DC converter suitable for modifying the direct current in order to make it suitable for supplying the charging device.

The DC/DC converter normally comprises a HF (high frequency) source, able to generate waves of high-tension electric tension (at present of the order of tenths or hundredths of kHz), according to circuit types of the flyback type, or the like. The tension waves are then sent to an HF transformer which galvanically isolates the high-tension primary circuit (rectifier and generator of tension waves) from the low-tension secondary circuit which comprises the charging device. This galvanic isolation is necessary to prevent damage or overtensions in the primary circuit from endangering the second circuit, which is low-tension and normally located close to the user (for example the exposed contacts of the connectors of a cell-phone or a computer).

To regulate the direct tension of the secondary circuit, it is usual to intervene on the duty-cycle of the high-frequency waves generated by the active switch.

The secondary circuit generally comprises a second rectifier (for example a single bridge rectifier or a double diode bridge rectifier combined with a center-tap transformer, a synchronous rectifier, etc.), electrically interposed between the transformer and the charging device, which is suitable for converting the low-tension waves exiting from the second circuit of the transformer into a direct low tension. A filter can be interposed between the rectifier and the charging device, for stabilizing the tension and/or the current on the charging device.

A well-established need in this sector is that of reducing the dimensions of DC/DC converters as much as possible. To attain this objective, given an equal power to apply to the charging device, it is fundamental to increase the frequency of the tension waves generated by the HF source, as in this way, over the time unit, the number of cycles in which electrical energy is transferred from the primary circuit to the second circuit is increased, thus also increasing the transferred power.

Increasing the frequency of the tension waves leads tendentially to the drawback of increasing the leakages in the ferromagnetic material which realizes the magnetic circuit of the transformer and the dynamic leakage in the active switch during the switching on and off of the active switch, which sets a limit to the maximum frequency of the tension waves which can be generated by the HF source and thus to minimum dimension of the transformer and the heat removing elements of the heat dissipated in the converter.

SUMMARY

In the light of the above, an aim of the present invention is to make available a method and an apparatus for transferring electrical power to a charging device, which effectively enables, at the same time, minimizing the problem of leakage, typical of DC/DC converters available at present.

A further aim of the invention is to guarantee effective galvanic isolation between the primary circuit and the secondary circuit at the same time.

These and other aims besides are attained by the characteristics of the various embodiments of the invention reported in the independent claims. The dependent claims delineate preferred and/or particularly advantageous aspect of the various embodiments of the invention.

An embodiment of the invention discloses a method for transferring electrical power to an electrical load, comprising steps of:

converting an direct electric current into an electric tension wave, applying the electric tension wave in inlet to at least a couple of electric capacitors, supplying the electrical load with the electric tension in outlet from the capacitors.

In other words, this embodiment substantially comprises replacing the transformer of the prior art with at least two electrical capacitors, thus solving the problem of leakage in the transformer.

The presence of this pair of capacitors is further able to guarantee galvanic isolation between the primary circuit and the secondary circuit, as well as transferring an electrical power sufficient to supply the charging device.

Each capacitor supplied with a tension wave can be considered an impedance, such that by means of a frequency of the tension wave that is sufficiently high and/or by means of electrical capacitors that are sufficiently large and/or by means of a tension wave having a sufficiently large amplitude, it is advantageously possible to obtain, in outlet from the pair of electrical capacitors, a tension wave that is sufficiently large for supplying the charging device.

In an aspect of the invention, the method can also comprise a step of:

rectifying the electric tension wave in outlet from the electrical capacitors.

This embodiment of the invention is advantageous when the charging device must be supplied with a direct electrical current.

In a further aspect of the present invention, the step of converting the direct electric tension into a wave of electric tension can comprise:

alternatingly switching an active switch, for example a transistor (MOSFET, BJT, IGBT, etc.) on and off.

In other words, this aspect of the invention introduces the possibility of generating the tension wave by means of a switching action, which represents a very simple solution that is reliable and easily controllable.

In this context, it is worthwhile to consider that transmitting high powers via the electrical capacitors with a switching action is not a simple, ordinary undertaking. Increasing the amplitude of the tension wave by a considerable amount typically means using a transformer or a step-up circuit before the galavanic isolation capacitors and a transformer or a step-down circuit after the galavanic isolation capacitors, with a relative increase in encumbrances, leakage and costs.

Increasing the amplitude of the tension wave is further deleterious in terms of safety. On the other hand, increasing the capacitors means using dielectric materials with higher dielectric constant and/or reducing the thickness of the dielectric, with a relative worsening of the galvanic isolation and an increase in electric leakage and/or increasing the dimensions of the armatures, with a consequent increase in the encumbrances.

Lastly, increasing the frequency of the tension wave with some switching systems of known type, such as for example bridge or half-bridge switching layouts, possibly resonant or almost resonant, generally leads to an increase in leakages and a difficult and expensive driving of the active switches, due to the presence of switches referring to a floating node.

For this reason, an aspect of the invention comprises that the step of converting the direct electric tension into a wave of electric tension can include the step of:

lowering the electrical power (tension and/or current) applied to the active switch to a substantially nil value during each transition step of the active switch: both from off (inhibited) to on (saturation), and from on to off.

In this way the electric leakages are considerably reduced during the switching cycles, in this way enabling an increase in the frequency of the cycles and thus the frequency of the tension wave generated thereby, with the result of being able to increase the electrical power transmitted given a same applied tension, or being able to lower the tension applied given a same transmitted electric power.

In a further aspect of the invention the step of conversion of the direct electrical tension into a wave of electrical tension can include using a circuital scheme based on a single active switch referred to a fixed potential, i.e. alternatively switching on and off, following the above-described modes, a single active switch, for example a single transistor (e.g. MOSFET, BJT, IGBT, etc.).

In this way, as well as the above-described advantages, the circuit complexity is much-reduced and the driver of the active switch is simplified, which can therefore be piloted at higher frequencies.

On the other hand, a typical problem which might arise when applying this method is the difficulty of controlling the power transferred to the charging device, due to the fact that this transferred power might depend on the charging device itself, which in turn might be neither constant nor known a priori.

Typically, in fact, resonant layouts with only one transistor are applicable to constant and known loads, as each displacement of the work point from the design point determines a drop in performance or a faulty behavior of the system.

For this reason, other aspects of the invention relate to the modes with which it is possible to vary the power transmitted to the electric charging device.

According to one of these aspects, the method can comprise the step of:

preventing or altering one or more cycles of on-and-off switching of the active switch.

When the switching-on and off cycles are inhibited, i.e. not performed, the electric power overall transmitted to the charging device is advantageously reduced, highly-efficient and with very low electric leakages.

The switching-on and off cycles can be inhibited for example by temporarily suspending the electric piloting signal of the active switch.

In more detail, an aspect of the invention includes the possibility of regulating the number and/or frequency of the cycles that are inhibited, on the basis of a predetermined reference value of the electric power which is to be transferred to the charging device.

In this way it is advantageously possible to regulate the electric power transmitted to the charging device such as to attain the above-mentioned reference value, which can be modified according to the specific charging device to be supplied and more in general according to needs.

Still more in detail, the regulating of the electrical power transferred can be performed with a feedback control which comprises for example steps of:

measuring the electrical power transferred to the charging device, calculating the difference between the electrical power measured and the predetermined reference value, and regulating the number and/or the frequency of the switching on and off cycles inhibited, such as to minimize the difference.

In addition to, or alternatively to the first mode of regulation of the electrical power to the charging device, a second mode of regulation can be used, which comprises the step of:

temporarily deviating the electric tension wave onto an electrical line set in parallel to the electrical load.

When the tension wave is deviated on the electric line, the charging device is not supplied, such that the electric power transmitted thereto is overall reduced.

In order to enable this deviating step, the electric line can comprise a second active switch, for example a second transistor (MOSFET, BJT, IGBT, etc.), and a third capacitor connected in series with the second active switch and having a capacitor value that is sufficiently high to be considered a short-circuit with respect to the charging device, when the second active switch is switched on (i.e. in saturation).

In this case too, an aspect of the invention includes regulating the duration of the switching step and/or the frequency with which the deviating step is eventually repeated, on the basis of a predetermined reference value of the electric power which is to be transferred to the charging device.

In this way it is advantageously possible to regulate the electric power really transmitted to the charging device in such a way as to attain the reference value, which can be modified according to the specific charging device to be supplied.

In particular, the regulating of the electrical power transferred can be performed with a feedback control comprising for example steps of:

measuring the electrical power transferred to the charging device, calculating the difference between the measured electrical power and the predetermined reference value, and regulating the duration of the deviation step and/or the frequency with which the deviation step is eventually repeated, such as to minimize the difference.

A third strategy for regulating the electrical power to the charging device can comprise the step of:

regulating the initial direct electric tension.

The regulating of the initial direct electric tension is obtainable for example by means of a DC/DC converter of any type, for example linear, switching and others besides.

As in the preceding cases, this strategy too can comprise regulating the electric tension on the basis of a predetermined reference value of the electrical power which it is desired to transfer to the charging device, for example by means of a feedback control of the electric power actually transferred.

This third strategy can be implemented alternatively or in combination with one or more of the preceding strategies.

A different aspect of the invention relates to the generating of the initial direct tension.

This direct tension can in fact be generated via a direct tension generator, for example a battery, or can be generated by the step of rectifying an alternated electric tension, which is provided for example by a common electric distribution grid.

In a different aspect of the invention, a first armature of each of the capacitors is installed on a user device, while the second armature of each of the electrical capacitors is installed on a supply device separate and independent of the user device, and the method comprises nearing the user device to the supply device such that the armatures installed on each thereof realize a same galvanic isolation capacitor.

This aspect of the invention delineates a method for transferring electrical power in a capacitive way, wireless, between the supply device and the user device, which can thus be electrically supplied in order to function or for charging the internal batteries thereof.

In this way it is possible to supply an electrical/electronic device, such as for example a cell-phone, simply by resting the device on the supply device, without galvanic contacts, such that the armatures installed in one and the other realize the capacitors described herein above.

A further embodiment of the invention discloses an apparatus for transferring electrical power to an electrical load, comprising:

at least a pair of electric capacitors, means for converting a direct electric tension into an electric tension wave, means for applying the electric tension wave in inlet to the capacitors, means for supplying the electrical load with the electric tension in outlet from the capacitors.

This embodiment of the invention essentially provides an apparatus which enables performing the transfer method of the electrical power described herein above, thus obtaining the relative advantages.

In particular, the presence of the two capacitors is able to guarantee galvanic isolation between the primary circuit and the secondary circuit, as well as transferring an electrical power that is sufficient to supply the charging device, at the same time resolving the problem of the electric leakages of the transformer and in the active and reactive elements that are used in the prior art.

In an aspect of the invention, the apparatus can also comprise:

means for rectifying the electric tension wave in outlet from the capacitors.

This embodiment of the invention is advantageous when the charging device is to be supplied with a direct electric tension.

In a further aspect of the invention, the means for converting direct electric tension into an electric tension wave can comprise a switching circuit provided at least with:

an active switch, for example a transistor (MOSFET, BJT, IGBT, etc.), and means (driver) for generating an electrical pilot signal suitable for switching the active switch on (i.e. saturation) and off (i.e. inhibition) alternatingly.

In more detail, switching circuits can be used that make use of one only active switch, for example one transistor alone (MOSFET, BJT, IGBT, etc.), relating preferably to a fixed, preferably minimum and low potential (ground), which represents a very simple solution, reliable, easily controllable and economical. Alternatively, other types of switching circuits can be used, which comprise, for example, two or more active switches, with the relative drivers.

It is further specified that the switching circuit (i.e. the electrical components making it up) might be physically located either upstream of the galvanic isolation capacitors or downstream thereof, i.e. between the galvanic isolation capacitors and the charging device, as the only thing that counts is that electric tension waves be applied to the capacitors.

In this context too, it is worthwhile mentioning that not all known switching circuits are able to generate a high-power tension wave with a modest degree of leakage.

For example, some typical switching circuits make use of floating transistors, which therefore require drivers provided with intrinsically-slow bootstrap circuits, or hard-switching circuits with high levels of dynamic leakage, which in fact limit the maximum switching frequency and therefore the frequency of the tension wave generated.

For this reason, in a preferred aspect of the invention, the converting means of the direct electric tension into the electric tension wave also comprise a reactive circuit, for example almost resonating or resonating, which is regulated such as to lower the electric power (tension and/or current) dissipated by the active switch of the switching circuit to a substantially nil value, during each transition step of the active switch: both from off to on and from on to off.

A reactive circuit is an electric circuit comprising one or more condensers and one or more inductors specially connected to one another. The setting-up of the reactive circuit consists in dimensioning the condensers and inductors, in terms respectively of capacity and electrical inductance.

In this aspect of the invention, the converting means of the direct electric tension into the electric tension wave comprise in practice a circuit diagram which, considering both the switching circuit and the reactive circuit, is assimilable to the circuit of an amplifier of class e, f, e/f or the like.

In this way the electrical leakages during the switching cycles of the active switch are considerably quashed, enabling in this way an increase to be made in the frequency of these cycles and therefore the tension wave frequency generated thereby, with the result that the electric power transmitted can be increased given a same applied tension, or the applied tension can be lowered given a same transmitted electric power.

Increasing the frequency of the electric tension brings the advantage of being able to reduce the dimensions of all the reactive components, and in particular the galvanic isolation capacitors, given a same electric power to be transmitted.

In an aspect of the invention, the reactive circuit can be set up in such a way as to filter the electric tension wave, leaving at least one of the fundamental frequencies thereof to pass towards the electrical charging device.

Considering the case of piloting the active switch of the switching circuit with a square-wave electric signal having a duty-cycle of 50%, the reactive circuit can be set up such as to allow the first fundamental frequency of the electric tension generated to pass, in which case the generating means of the tension wave will be assimilable to an e-class amplifier. Alternatively, the reactive circuit can be set up such as to allow the third fundamental frequency and/or other greater harmonics of the electric tension wave to pass, in which case the generating means of the tension wave will be assimilable to an f-class amplifier. It is however possible for the reactive circuit to be set up in such a way as to allow fundamental frequencies of higher frequencies to pass, or to allow several frequencies to pass at the same time, with a similar behavior to an e/f class amplifier or the like.

This aspect of the invention has the advantage of improving the transfer of electrical power to the charging device and of minimizing the energy dissipated.

It is specified at this point that the electrical components defining the reactive circuit might be physically located all upstream of the galvanic isolation capacitor, or all downstream thereof, or between the galvanic isolation capacitors and the charging device, or they might be distributed in part upstream and in part downstream of the galvanic isolation capacitors, without this modifying the effect.

Further, the galvanic isolation capacitors might even be an integral part of the reactive circuit, or might be independent thereof.

Further aspects of the invention relates to the way in which the power transmitted to the electrical charging device can be varied.

In one of these aspects, the apparatus can comprise means for controlling the electrical pilot signal, the control means being configured for:
  suspending or modifying the generating of the electrical pilot signal, such as to prevent or alter one or more consecutive switching on and off cycles of the active switch.

During the inhibited cycles the electrical load is not supplied and the system continues to oscillate according to free damped oscillation modes. During the cycles effected, the charging device is instead supplied and the system oscillates according to forced oscillating modes.

As explained in the foregoing, this aspect of the invention has the advantage of enabling a variation in the overall electric power transmitted to the charging device, with very small electric leakage and high efficiency.

In more detail, an aspect of the invention comprises the possibility that the control means are configured to regulate the number and/or frequency of the cycles which are inhibited (i.e. the duration of the suspension of the pilot signal and/or the frequency with which the suspension can possibly be repeated), on the basis of a predetermined reference value of an electrical parameter that is characteristic of the electric power to be transferred to the load.

The above electrical parameter that is characteristic of the electric power can be the electric power itself, or can be the supply tension of the charging device or possibly the supply current transmitted to the charging device.

In this way it is advantageously possible to regulate the electric parameter characteristic of the electric power transmitted to the charging device in such a way as to attain the above-mentioned reference value, which can be modified according to the specific charging device to be supplied.

Still more in detail, the control means can be configured such as:
  measuring, using appropriate sensors, the above-mentioned electric parameter characteristic of the electric power, for example by means of a sensor suitable for generating a feedback signal coming from the secondary at low tension, or using sensors suitable for measuring one or more tension and/or current values on the primary from which the power on the charging device can be indirectly calculated, then
  calculating the difference between the measurement of the electrical parameter characteristic of the electric power and the predetermined reference value, and
  regulating the number and/or the frequency of switching-on and off cycles which are inhibited, such as to minimize the difference.

In addition or alternatively to the control means, the apparatus can comprise:
  means for temporarily deviating the electric tension wave onto an electrical line set in parallel to the electrical load.

When the tension wave is deviated onto the electric line, the charging device is not supplied, such that the electric power transmitted thereto is overall reduced.

The means for deviating the electric tension wave can comprise for example a second active switch, for example a transistor, a third electric capacitor arranged in series to the second active switch along the electric line, and means (driver) for generating an electrical pilot signal for switching on (i.e. saturation) and off (i.e. inhibiting) the second active switch, alternatingly.

The third electric capacitor must have a sufficiently high value to be considered as a short circuit with respect to the charging device, when the second active switch is on (i.e. in saturation).

In this way, when the second active switch is on, the electric energy transferred by the capacitors is deviated onto the control capacity, while when it is off the charging device absorbs all the energy.

It is notable that the efficiency of the system can be constantly high, as when the second active switch is on, there is only reactive power exchanged in the circuit, while when it is off, the energy is transferred to the charging device.

The electric pilot signal of the second active switch can be a PWM signal or the like, such that the electric power transmitted to the charging device is proportional to the duty-cycle of the electric pilot signal.

Note that the pilot signal of the second active switch is independent from the pilot signal of the active switch of the switching circuit.

An aspect of the invention includes the possibility that the apparatus comprises means for regulating the duration of the deviation step and/or the frequency with which the deviation step is eventually repeated, on the basis of a predetermined reference value of an electric parameter characteristic of the electric power that is to be transferred to the charging device.

In this case too, the electric parameter characteristic of the electric power can be the electric power itself, or can be the tension of the supply charge or even the supply current transmitted to the charging device.

In this way it is advantageously possible to regulate the electric parameter characteristic of the electric power transmitted to the charging device in such a way as to attain the reference value, which can be modified according to the specific charging device to be supplied.

The regulating means can comprise for example a control circuit configured such as to regulate the duty-cycle of the electric pilot signal of the second active switch mentioned in the foregoing.

In more detail, the control circuit can be configured for:

measuring the above-mentioned electric parameter characteristic of the electric power, calculating the difference between the measurement of the electric parameter characteristic of the electric power and the predetermined reference value, and regulating the duty-cycle of the electric pilot signal of the second active switch, such as to minimize the difference.

Note that this regulating system is very reactive and that the ripple on the output tension can be very small. In fact, considering that the working frequency of the tension-wave generating circuit (e.g. class e or f or elf) is very high, the control circuit can work at any frequency independently of the working frequency of the tension-wave generating circuit, and therefore if necessary also at high frequencies (even MHz or hundreds of kHz), thus with very small ripples.

A further advantage of this functioning diagram is the total independence of the control circuit, located on the secondary, with respect to the primary circuit.

This enables eliminating a further expensive transmission circuit of the feedback signal from the primary to the secondary (typically an opto-isolator or another transferring means of the primary or secondary feedback signal in any case guaranteeing galvanic isolation), as the whole control process occurs on the side of the low-tension circuit side.

Again, for regulating the electric power transmitted to the load, the apparatus can comprise, additionally to or alternatively to the above-described means, means for regulating the initial direct electric tension.

The regulating means can comprise, for example, a DC/DC converter located upstream of the switching circuit, for example a linear, switching or any other type of DC/DC converter.

As in the preceding cases, this aspect of the invention can also comprise the electric tension regulating means being configured in such a way as to regulate the electric tension on the basis of an electric parameter characteristic of the electric power to be transferred to the electrical load (the electric power itself, supply tension of the charging device or supply current of the charging device), for example by means of a feedback control diagram.

A different aspect of the invention relates to the generating of the initial direct tension.

In an aspect of the invention, the apparatus can comprise a direct tension generator, for example a battery, for supplying the converting means which generate the electric tension wave.

In this case, the whole apparatus would in fact fall within the category of DC/DC converters.

Alternatively, the apparatus can comprise rectifier means, for example a diode bridge rectifier with a filter for reducing the output ripple, which are connectable to an alternating tension source, for example a common electric distribution grid, such as to rectify the alternating electric tension into a direct electric tension and supplying the direct electric tension to the converter means for generating the electric tension wave.

In the second case, the whole apparatus falls in fact into the category of AC/DC converters.

In an embodiment of the invention, each of the galvanic isolating capacitors can be a pre-assembled component, i.e. a condenser, and the capacitors can therefore be installed in a same device.

This embodiment is such that the whole apparatus constitutes in fact a converter (taken to mean a single component), which can be connected via electric cables to an electrical load, such as for example an electric/electronic device, which must be supplied or recharged.

Alternatively, in a further embodiment of the invention the apparatus comprises a user device and a supply device, separate and independent from the user device, in which the user device comprises a first armature of each of the galvanic isolation capacitors, while the supply device comprises the second armature of each of the capacitors.

In this embodiment of the invention, the apparatus becomes suitable for transferring electric power in a capacitive way and wirelessly between the supply device and the user device, which is electrically supplied such as to be able to function or for charging the internal batteries thereof.

In particular, the user device can be any electric/electronic device, such as for example a cell-phone, a computer or the like, which can be supplied or recharged simply by resting on the supply device, such that the armatures installed in the receiving device and in the emitting device realize in fact the galvanic isolating capacitors described herein above.

BRIEF DESCRIPTION OF THE DRAWINGS

Further characteristics and advantages of the invention will emerge from a reading of the following description, provided by way of non-limiting example, with the aid of the figures illustrated in the accompanying tables of drawings.

FIG. 1 is a simplified circuit diagram of an apparatus for transferring electric power according to an embodiment of the present invention.

FIG. 2 is a variant of the simplified circuit diagram of FIG. 1.

DETAILED DESCRIPTION OF THE PREFERRED EMBODIMENTS

Figure 3:
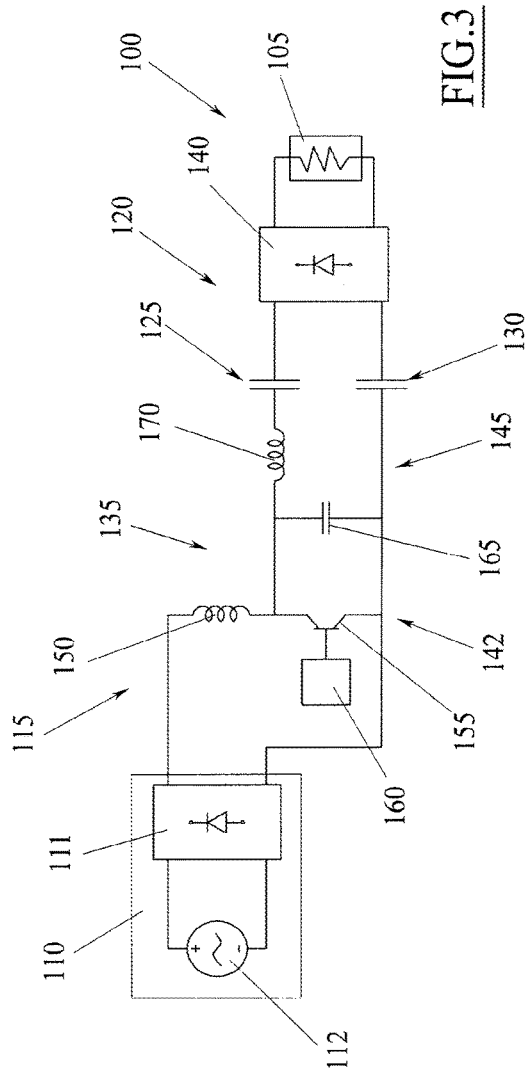
FIG. 3 is a more detailed circuit diagram of the apparatus of FIG. 1.

As shown in FIG. 1, an embodiment of the present invention provides an apparatus 100 for transferring electrical power to an electrical charging device 105.

The electrical charging device 105 may be for example any electric or electronic device that must be powered to enable operation and/or to charge the internal batteries of the device itself. Classic examples of this type of electrical/electronic device are mobile phones, computers, televisions and others besides.

From a circuit point of view, the apparatus 100 shown in the example of FIG. 1 is a DC/DC converter, which is suitable for transferring electric power from a DC tension source 110 to a charging device 105, which is here generally denoted by an electrical resistance symbol.

The DC tension source 110 may be for example a battery.

Alternatively, the source 110 could include a rectifier 111, for example, a diode bridge, a single diode, a coupled double diode, or another synchronous rectifier, which is suitable for connecting with a source of alternating tension 112, for example a common electrical distribution grid at 230V and 50 Hz, so as to rectify the alternating tension generated by the source 112. A filter stabilizer may be present immediately downstream of the rectifier 111. In the second case, the apparatus 100 would be more properly configured as an AC/DC converter.

The apparatus 100 schematically comprises a primary circuit 115 directly connected with the source 110, and a secondary circuit 120 directly connected with the charging device 105, which are mutually electrically isolated by at least a pair of isolating electric capacitors, of which a first capacitor 125 and a second capacitor 130.

The primary circuit 115 comprises a converter 135 for converting the direct electric tension generated by the source 110 into a tension wave, i.e. into a succession of tension pulses in which each tension pulse varies from a minimum value, for example but not necessarily substantially nil, to a maximum value depending on the entity of the DC tension at input.

The tension wave in output from the converter 135 is then applied to the pair of capacitors 125 and 130, which transmit the tension wave to the secondary circuit 120.

The secondary circuit 120 includes a rectifier 140, which is suitable for rectifying the tension wave in output from the pair of capacitors, so as to newly obtain a DC tension. The rectifier 140 may be a bridge diode rectifier, a single diode, a coupled double diode, or another synchronous rectifier. Possibly, the rectifier 140 may be combined with a subsequent stabilization stage of the tension (e.g. LC filter or other).

The direct tension output from the rectifier 140 is then applied to the input terminals of the electrical charging device 105 to be supplied.

In practice, the electrical charging device 105 is connected in series between the two capacitors 125 and 130 which, as they can be regarded as a pair of impedances, enable transmission to the secondary circuit 120 of a sufficiently high tension wave to be rectified in the rectifier 140, possibly stabilized, and then used to supply the charging device 105.

Note at this point that in other embodiments the rectifier 140 may be absent, thus obtaining a DC/AC (or AC/AC) converter capable of supplying the charging device 105 with an alternating tension.

Entering into more detail, in a preferred aspect of the invention the converter 135 includes a switching circuit 142, which is suitable for generating the tension wave applied to the capacitors 125 and 130.

In general, the switching circuit 142 comprises at least one active switch 155, for example a transistor (e.g. BJT bipolar junction transistor, FET field effect transistor, MOSFET, MESFET, JFET, IGBT and others besides), and a driver for applying an electrical pilot signal to the active switch 155, which signal can turn on (i.e. in saturation) and off (inhibit) the active switch.

Here it is specified that although in the present example the switching circuit 142 is located upstream of the galvanic isolation capacitors 125 and 130, in other embodiments the same switching circuit 142 could be placed between the galvanic isolation capacitors 125 and 130 and the charging device 105, since the only thing that matters is that tension waves are applied to the capacitors 125 and 130.

In order to generate a wave of high frequency tension with low electrical leakages, the converter 135 may also include a reactive circuit 145, for example, an almost-resonant, resonant or fully resonant circuit, which is set up such as to lower the electrical power (e.g. tension and/or current) applied to the active switch 155 of the switching circuit 142 to a value of substantially nil, during each transition of the active switch 155 from off to on and vice versa. In addition to the value of the electrical power, the reactive circuit 145 is preferably set up so that the time derivative of the electric power applied to the active switch 155 is also substantially nil, during each transition of the active switch 155 from on to off and possibly vice versa.

It is specified here that, although the reactive circuit 145 of this example is located upstream of the galvanic isolation capacitors 125 and 130, it could alternatively also be placed between the galvanic isolation capacitor 125 and 130 and the charging device 105, or some of its components can be located upstream and others downstream of the galvanic isolation capacitors 125 and 130, without thereby modifying the effect.

Further, the galvanic isolation capacitors 125 and 130 may be an integral part of the reactive circuit 145, or may be independent thereof.

Purely by way of example, the converter 135 can overall present the circuit diagram shown in greater detail in FIG. 3.

The converter 135 of the example of FIG. 3 comprises a first inductor 150, commonly called the choke or feed inductor, connected in series with the DC tension source 110. During normal operation, the first inductor 150 behaves essentially as a direct current generator.

In series with the inductor 150, the converter 135 includes the above-mentioned active switch 155, for example a transistor (MOSFET, IGBT, BJT or other), having a head (e.g. the drain of a MOSFET type N) connected with the output terminal of the inductor 150, and the other end (e.g. the source for a MOSFET N-type) connected in circuit with the source 110, and the piloting head (e.g. the gate for a MOSFET) connected with a driver 160, i.e. with an electrical/electronic device suitable for generating and applying an active electric pilot signal to the pilot head of the switch 155.

The pilot signal can for example be a square wave electrical signal with a duty-cycle of 50%.

When the driving signal is ON (for example, a gate tension higher than the source for an N type MOSFET), the active switch 155 switches on (i.e. goes into saturation allowing passage of current in the active switch); when instead the drive signal is OFF (such as a lower gate tension than the source for a MOSFET), the active switch 155 is switched off (or is inhibited preventing the passage of current in the active switch).

In series with the inductor 150, but in parallel with the active switch 155, the converter 135 can include a capacitor 165, the output terminal of which is connected in short circuit with the tension source 110, via an electrical branch to which a head of the active switch 155 and the second isolation capacitor 130 are also connected.

In series with the inductor 150, but in parallel with both the active switch 155 and the capacitor 165, the converter 135 can comprise a further inductor 170, which is connected in series with the first isolation capacitor 125.

The inductor 170 can also be divided into two or more inductors the total value of which remains the same, placed upstream or downstream of capacitor 125 and 130, without the system changing the operating principle.

In this way, when the active switch 155 is switched on, the inductor 150 charges.

Instead, when the active switch 155 is switched off, the current flows only to the charging device, discharging the inductor 150.

Since the active switch 155 is switched on and off alternatingly by following the pilot signal, success tension impulses are applied to the isolating capacitors 125 and 130 which overall form the above-mentioned tension wave, which is then transferred to the secondary circuit 120, and then applied to the charging device 105.

It is observed that in this embodiment the isolation capacitors 125 and 130 can form a part of the reactive circuit constituted overall by the reactances comprised between the converter 135 and the charging device 105.

As already mentioned, this reactive circuit is set up in such a way that the electric power (e.g., tension and/or current) applied to the active switch 155, and preferably also its derivative in time, have a value of substantially nil, during each step of transition of the active switch 155 from off to on and from on to off.

This set-up essentially consists of a suitable choice of the reactive components.

Figure 4:
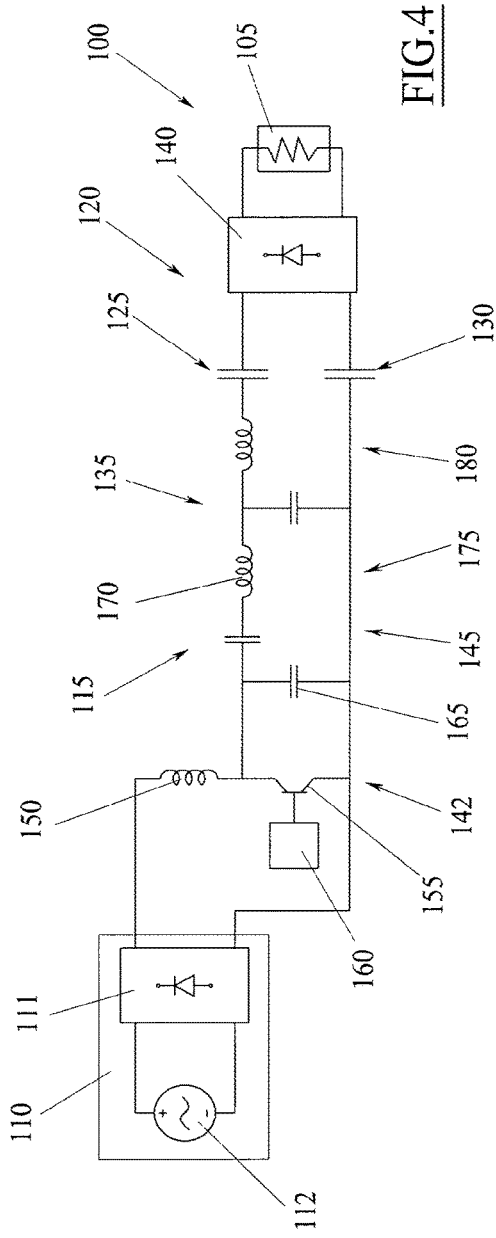
FIG. 4 is a variant of the circuit diagram of FIG. 3.

In other embodiments, such as the one illustrated in FIG. 4, the reactive circuit 145 can include two reactive grids, of which a first reactive grid 175 for ensuring the proper functioning of the active switch 155, and a subsequent reactive grid 180, for ensuring a correct set-up of the system with a different charge from the one used to transmit the desired power.

The reactive circuit 145 normally also serves as a passband filter for the tension wave that is transferred between the primary circuit 115 and the secondary circuit 120. The band of frequencies allowed to pass from the filter also depends on the set-up of the reactive circuit 145.

In this regard, it is preferable for the reactive circuit 145 to be set up so as to pass one or more of the fundamental frequencies of the tension wave.

Considering the specific example in which the active switch 155 is piloted by an electric signal square wave having a duty-cycle of 50%, the fundamental frequencies of the tension wave are those in odd order: the first, third, the fifth and so on. The reactive circuit 145 can therefore be set up so as to let the first fundamental frequency of the electric tension pass, in which case the converter 135 is in fact assimilable to an e-class amplifier. Alternatively, the reactive circuit 145 can be set up so as to let the third fundamental frequency of the electric tension pass, or other odd harmonics, in which case the converter 135 is in fact similar to an f-class amplifier. It is also possible for the reactive circuit 145 to be set up so as to let the fundamental frequencies of a higher order pass, or to let more fundamental frequencies pass simultaneously, in such a way as to realize an e/f class amplifier or the like.

As previously mentioned, during the switching on and off cycles of the active switch 155, the inductor 150 undergoes continuous cycles of charging and discharging.

In this regard, it is preferable to size the inductor 150 so as to make it fully discharge at each cycle. In other words, contrary to what happens in a classically-dimensioned choke inductor, in which the current passing through it can be considered constant, for this specific case it is possible to dimension the choke inductor 150 to oscillate the current crossing it between a maximum value and nil (avoiding however the inversions). In this way, the value of the inductor is drastically reduced. Having lower inductor values is important for this specific case because: the overall dimensions and the ohmic losses can be contained to modest proportions, and inductors can be used that are realized for example by inductors wrapped in air or another material with low losses in the core of the inductor itself.

A problem that can arise with an apparatus 100 such as the one described above consists in the regulation of electric power transmitted to the charging device 105. This is the issue that limits the use of e- or f- or e/f-class amplifiers in variable charge and unknown situations a priori.

Figure 5:
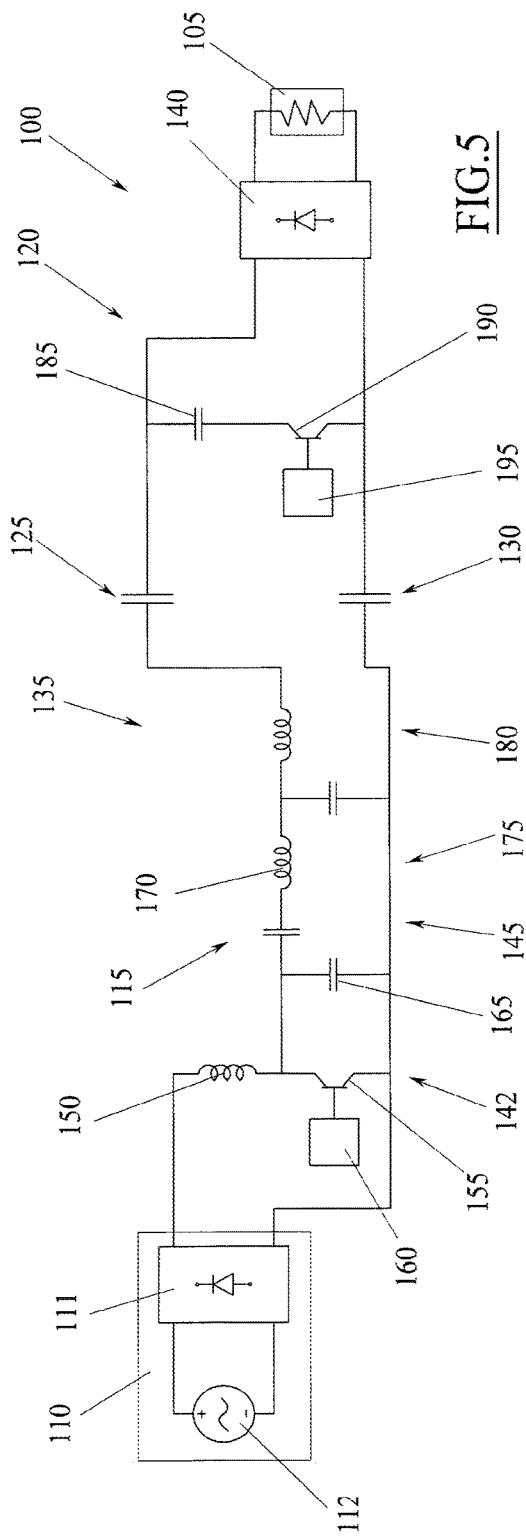
FIG. 5 is a variant of the circuit diagram of FIG. 4.

To make this type of adjustment, FIG. 5 illustrates an embodiment of the apparatus 100 which differs from that of FIG. 4 only in that, downstream of the converter 135 and preferably downstream also of the isolation capacitors 125 and 130, in parallel with the rectifier 140, an electric line has been inserted comprising a capacitor 185 in series with a further active switch 190, for example a transistor (e.g. BJT, FET, MOSFET, MESFET, JFET, IGBT and others).

The active switch 190 can be connected to a driver 195 suitable for generating and applying a pilot signal to the pilot head of the active switch 190, preferably a PWM electric signal or the like.

When the pilot signal is ON, the active switch 190 turns on (i.e. goes into saturation allowing passage on the line); instead, when the drive signal is OFF, the active switch 190 turns off (or passes into inhibition, preventing current flow on the line).

The capacitor 185 has a value that is sufficiently high to be considered a short circuit with respect to the charging device 105, when the active switch 190 is turned on.

In this way, when the active switch 190 is turned on, the electrical energy transferred from the isolation capacitors 125 and 130 is predominantly diverted onto the capacitor 185, while when it is off, the charging device 105 absorbs all the energy.

The electric power transmitted to the charging device 105 is therefore inversely proportional to the time in which the active switch 190 is turned on, for example to the duty-cycle of the PWM electrical pilot signal. Therefore, by adjusting the ignition time of the active switch 190, for example by adjusting the duty cycle of the PWM electrical pilot signal, it is advantageously possible to adjust the electric power transferred to the charging device 105.

For example, the driver 195 can include a control circuit (not illustrated), which is configured to adjust the duty cycle of the PWM pilot signal, so as to attain a predetermined value of a characteristic parameter of the electric power to be transferred to the charging device 105.

The electrical parameter that is characteristic of the electric power can be the electric power itself, or it can be the tension of the power supply of the charge or possibly the supply current transmitted to the charging device.

More particularly, the control circuit may be configured to perform a feedback control which comprises: measuring the electrical parameter characteristic of the electric power transferred to the charging device, for example through one or more tension and/or current sensors applied to the secondary circuit 120; calculating the difference between the measurement of the electrical parameter characteristic of the electric power and the predetermined reference value; and adjusting the duty cycle of the PWM electrical pilot signal, such as to minimize the difference.

Note that this method for regulating power can be applied to all the circuit diagrams shown in the drawings and other circuits of the same type.

In addition or alternatively to this control mode, the electric power transmitted to the charging device 105 can also be adjusted by acting on the primary circuit 115, for example by suspending the generation of the pilot signal pulses of the active switch 155, in such a way as to inhibit one or more on and off cycles of the active switch 155.

During the inhibited cycles the inductor 150 is not powered and the system continues to oscillate in a damped free oscillating mode. During the cycles carried out, the inductor 150 is instead supplied and the system oscillates in a forced oscillations mode.

In this way, by suitably adjusting the number and/or the "suspended" pulse frequencies, the electric power transferred to the charging device 105 is effectively regulated.

For this purpose, the driver 160 may comprise a control circuit (not illustrated), which is configured to adjust the number and/or the frequency of "suspended" electrical impulses of the pilot square wave, in order to follow a predetermined value of an electrical parameter characteristic of the electric power to be transferred to the charging device 105.

In this case too, the electrical parameter characteristic of the electric power can be the electric power itself, or it can be the power supply tension of the charging device or possibly the supply current transmitted to the charging device.

In greater detail, the control circuit may be configured to perform a feedback control which comprises: measuring the electrical parameter characteristic of the electric power transferred to the charging device, for example via one or more tension and/or current sensors applied to the secondary circuit 120 or to the primary circuit 115; calculating the difference between the measurement of the electrical parameter characteristic of the electric power and the predetermined reference value; and regulating the number and/or the frequency of the "suspended" electrical impulses of the square wave drive, such as to minimize the difference.

This technique of adjustment of the power can also be applied to all the circuit diagrams shown in the drawings as well as to other circuits of the same type.

In addition or alternatively to the methods mentioned above, the power transmitted to the charging device 105 can also be adjusted by regulating the direct electric tension generated by the source 110.

As shown in FIG. 2, the apparatus 100 may in fact comprise a DC/DC converter 200, such as a linear converter, a switching converter, or any other type, which is placed downstream of the source 110 and upstream of the switching circuit 142, for example upstream of the choke inductor 150 (with reference to the diagrams of FIGS. 3 to 5).

The DC/DC converter 200 can be configured to provide a tension value at output that is different to the value of the input tension, and thus consequently modifying the electric power transmitted to the charging device 105.

As in the previous cases, the DC/DC converter 200 can also include a control circuit (not shown) suitable for adjusting the tension according to a desired value of an electrical parameter characteristic of the electric power to be transferred to the electrical load 105, for example by means of a feedback control routine.

In this case too the electrical parameter characteristic of the electric power can be the electric power itself, or it can be the power supply tension of the charging device or possibly the supply current transmitted to the charging device.

Although this solution has been described with reference to the generic circuit of FIG. 2, it is obvious that the same may apply to all the circuit diagrams shown in the drawings as well as to others of the same type.

Figure 6:
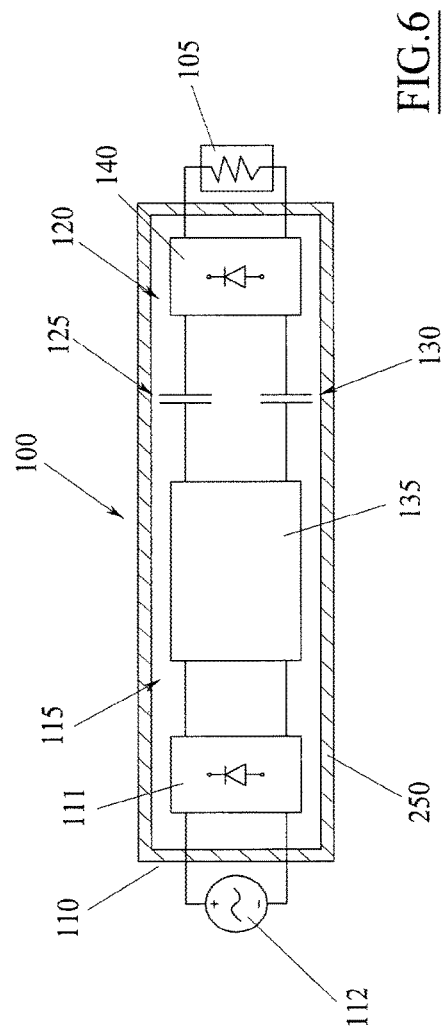
FIG. 6 schematically illustrates a practical realisation of the apparatus of FIG. 1.

As illustrated in FIG. 6, in an embodiment of the invention each version of the apparatus 100 described above can be realized as a converter device 250 (meaning a single component), which can be connected via cables to the electrical charging device 105.

In this case, all the essential components of the apparatus 100, including in particular the converter 135, the isolation capacitors 125 and 130, the rectifier 140, any filter and tension stabilization stages and the rectifier 111 if present, can be integrated into a single "indivisible object" which can be connected on one side with the source of alternating tension 112, or with the DC tension source 110, and on the opposite side with the charging device 105.

In particular, each of the isolation capacitors 125 and 130 can be realized in the usual way as a pre-assembled capacitor, which is installed as a single unit in the "indivisible object".

Even the charging device 105 may be part of that "indivisible object."

Alternatively, in a very important alternative embodiment of the invention, any version of the apparatus 100 described above can be realized as a system for wireless transmission of power between two separate devices, without galvanic connection between them.

Figure 7:
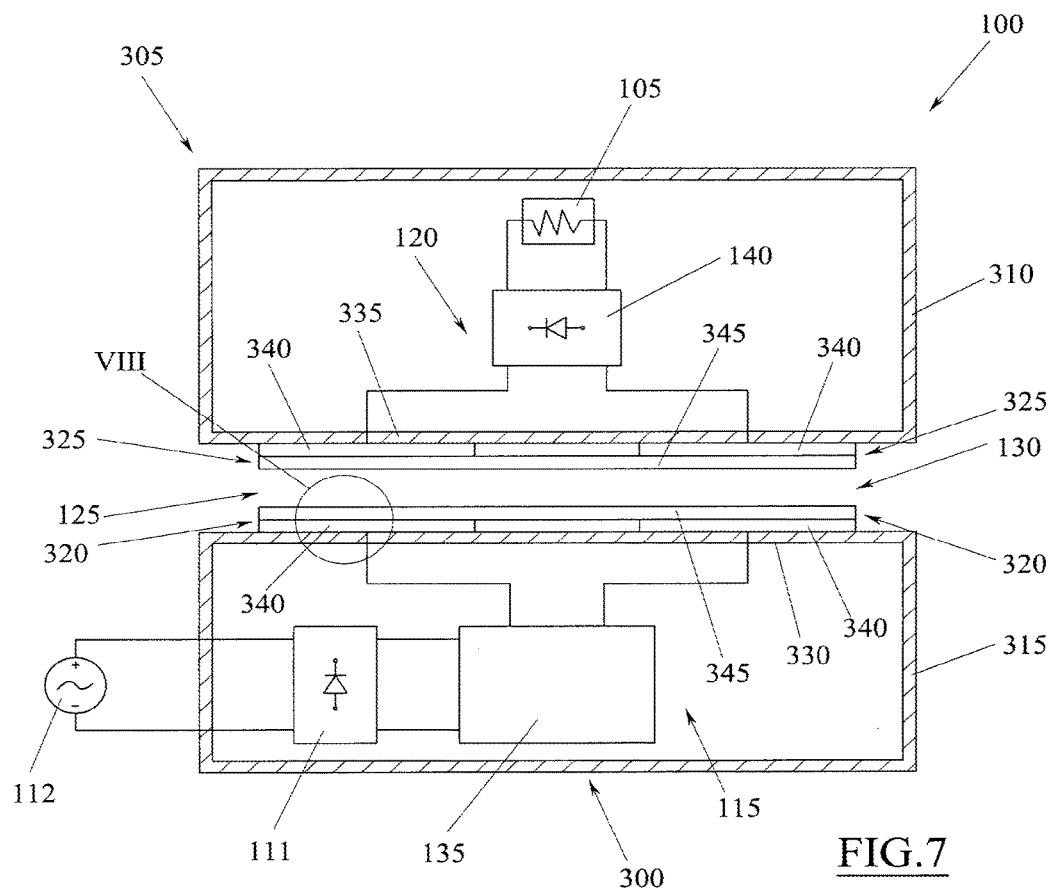
FIG. 7 is a schematic diagram of a second practical embodiment of the apparatus of FIG. 1.

As shown in FIG. 7, said wireless transmission system thus comprises a power supply device 300 and a user device 305, separate and independent from the power supply device 300, i.e. not exhibiting any type of physical/mechanical connection with the power supply 300.

The user device 305 may be any electrical/electronic device, such as a mobile phone, a computer, tablet, lighting system, television set or other, provided with its own external body or casing 310 independent of the external body or casing 315 of the supply device 300.

The power supply device 300 can comprise the components of the apparatus 100 that define the primary circuit 115, including in particular the converter 135 and the rectifier 111 if present, which can be integrated into a single "indivisible object" suitable for connecting via cable with the source of alternating tension 112, or possibly with the DC tension source 110.

The user device 305 can instead include the components of the apparatus 100 that define the secondary circuit 120, including in particular the rectifier 140 and the charging device 105, which can be represented by the internal batteries to be recharged and/or electronic devices to be supplied to enable the user device 305 to operate.

The isolation capacitors 125 and 130 may be defined by a pair of armatures 320 incorporated in the power supply device 300, and by another pair of armatures 325 incorporated in the user device 305.

Each armature 320 and 325 may be realized by any layer of conductive material 340 coated with a layer of dielectric material 345.

The armatures 320 and 325 must be placed in the respective devices so that by nearing the user device 305 to the power supply device 300, for example by placing the former on the latter, the conductor layer 340 of each armature 320 realizes, with the conductor layer 340 of a corresponding armature 325, and with the dielectric material 345 which remains interposed between them, respectively the isolation capacitor 125 or the isolation capacitor 130.

In this regard, the outer casing 315 of the supply device 300 may comprise a support wall 330, and the outer casing 310 of the user device may comprise a reference wall 335, which will be facing and supported on the wall of the support 330 of the feeder device 300.

The armatures 320 can be applied on the external or internal surface of the support wall 330, while the armatures 325 may be applied on the external or internal surface of the wall 335.

Figure 8:
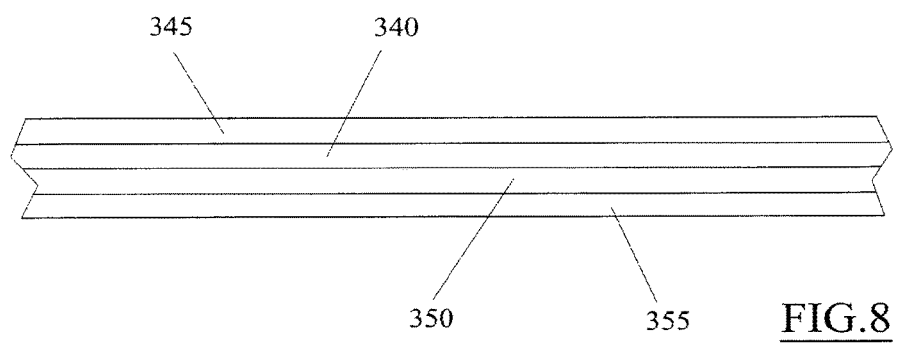
FIG. 8 is the detail VIII of FIG. 7, in enlarged scale.

As shown in FIG. 8, each armature 320 and 325 may more precisely comprise three superposed layers, in which the conductive layer 340 is interposed between the upper dielectric layer 345 and a lower dielectric layer 350. The lower dielectric layer 350 can be supported on a substrate 355.

The upper dielectric layer 345 of each armature 320 is destined to go into direct contact with the upper layer of an armature 325.

The substrate 355 of each armature 320 can be a portion of the supporting wall 330 of the supply device 300, while the substrate 355 of each armature 325 may be a portion of the reference wall 335 of the user device 305.

The substrate 355 may be made of any conductive or dielectric material, provided it is sufficiently distant from the conductive layer 340. If, however, is very close to the conductive layer 340, it is better for the substrate 355 to be a dielectric characterized by low leakage and low dielectric constant when stressed by the electric field which varies over time. If the substrate 355 is a dielectric material, the lower dielectric layer 350 could be absent.

The lower dielectric layer 350, if present, is preferably characterized by low leakage and low relative dielectric constant, so that the electric field propagates little in the direction of the substrate.

The conductive layer 340 can be of any electrically conductive or semiconductive material, possibly doped, although the best results are obtained with low resistivity materials.

The upper dielectric layer 345 should preferably enable the best possible electrical coupling between the conductive layers 320 of the armatures 320 and the armatures 325. Therefore, the upper dielectric layer 345 is preferably as thin as possible, characterized by low leakages and a high relative dielectric constant.

In this way, the electrical charging device 105 of the user device 305 may be powered or recharged, without any galvanic connection, simply by placing the plates 325 of the user device 305 on the armatures 320 of the feeder device 300, such that the conductive layers 340 and the upper dielectric layers 345 of the armatures 320 and 325 realize the first and the second isolation capacitors 125 and 130 of the apparatus 100, enabling the transferring of power to the charging device 105.

With the proposed layout, by virtue of using a high frequency resonant converter 135 (e.g. class "e", "f" or "elf"), or resonant with higher harmonics than the pilot, allowing high power frequencies of the armatures 320 and 325, armatures 320 and 325 of very small dimensions are possible, such as to be easily housed internally of electronic devices in common use such as cell-phones, computers, cameras, MP3 players, lighting systems, for example LED systems, television sets and more besides.

At the same time, it can be guaranteed that the tension attained by the armatures 320 and 325 is extremely low (for example a few tens of volts), which avoids any risk to the user even in the absence of the control circuits.

In this way very high energy efficiency is ensured, as well as a drastic reduction in overall dimensions, low working tensions, high transmitted power, and low production costs.

Naturally a technical expert in the sector might make numerous modifications of a technical-applicational nature to what has been described herein above, without forsaking the scope of the present invention, as claimed in the following.

REFERENCES 100 apparatus
105 electrical load
110 source of direct tension
111 rectifier
112 source of alternating current
115 primary circuit
120 secondary circuit
125 first capacitor
130 second capacitor
135 converter
140 rectifier
142 switching circuit
145 reactive circuit
150 inductor
155 active switch
160 driver
165 capacitor
170 inductor
175 first reactive grid
180 second reactive grid
185 capacitor
190 active switch
195 driver
200 DC/DC converter
250 converter device
300 supply device
305 user device
310 external casing
315 external casing
320 armature
325 armature
330 support wall
335 reference wall
340 conductor layer
345 upper dielectric layer
350 lower dielectric layer
355 substrate

The invention claimed is:

1. A method for transferring electric power to an electrical load (105), comprising steps of:
converting an direct electric current into an electric tension wave,
applying the electric tension wave in inlet to at least a couple of electric capacitors (125, 130) including a first electric capacitor (125) and a second electric capacitor (130),
supplying the electrical load (105) with the electric tension in outlet from the capacitors (125, 130),
wherein the conversion step comprises:
alternatingly switching a single active switch (155) on and off, and
lowering electrical power dissipated by the active switch (155) to a substantially nil value during each transition step of the active switch (155).

2. The method of claim 1, comprising a further step of:
rectifying the electric tension wave in outlet from the first and second electric capacitors (125,130).

3. The method of claim 1, comprising steps of:
preventing one or more switching on and off cycles of the active switch (155).

4. The method of claim 3, wherein a regulating of the electrical power transferred is performed with a feedback control which comprises the steps of:
measuring the electrical power transferred to the electrical load,
calculating the difference between the electrical power measured and the predetermined reference value, and
regulating the number and/or the frequency of the switching on and off cycles inhibited, such as to minimize the difference.

5. The method of claim 1, comprising a deviation step of:
temporarily deviating the electric tension wave onto an electrical line in parallel to the electrical load (105), wherein the electric line comprises a second active switch (190) and a third capacitor (185) connected in series with the second active switch and having a capacitor value that is sufficiently high to be considered a short-circuit with respect to the electrical load, when the second active switch is switched on.

6. The method of claim 5, wherein a regulating of the electrical power transferred is performed with a feedback control comprising the steps of:
measuring the electrical power transferred to the electrical load,
calculating the difference between the measured electrical power and the predetermined reference value, and
regulating the duration of the deviation step and/or the frequency with which the deviation step is eventually repeated, such as to minimize the difference.

7. The method of claim 1, comprising a step of:
regulating the direct electric current.

8. The method of claim 1, wherein the direct electric current is obtained via a step of rectifying an alternating electric current.

9. The method of claim 1, wherein the first armature (325) of each of the first and second electric capacitors (125, 130) is installed on a user device (305), while the second armature (320) of each of the first and second electric capacitors (125, 130) is installed on a supply device (300) separate and independent of the user device (305), and wherein the method comprises nearing the user device (305) to the supply device (300) such that the first armature (325) installed on the user device (305) and the second armature (320) installed in the supply device (300) realize the first and second electric capacitors (125, 130).

10. An apparatus (100) for transferring electric power to an electrical load (105), comprising:
at least a pair of electric capacitors (125, 130) including a first electric capacitor (125) and a second electric capacitor (130),
converter means (135) for converting a direct electric tension into an electric tension wave,
means for applying the electric tension wave in inlet to the capacitors (125, 130),
means for supplying the electrical load (105) with the electric tension in outlet from the pair of electric capacitors,
wherein the converter means (135) comprise a switching circuit comprising:
a single active switch (155),
means (160) for generating an electrical pilot signal suitable for switching the active switch (155) on and off, and
a reactive circuit (145) set up such as to lower electrical power dissipated by the active switch (155) to a substantially nil value, during each transition step of the active switch (155).

11. The apparatus of claim 10, comprising:
means (140) for rectifying the electric tension wave in outlet from the capacitors (125, 130).

12. An apparatus (100) according to claim 10, wherein the converter means (135) comprise:
a first inductor (150) connected in series with a DC tension source (110) and with the active switch (155), said active switch (155) having a first end connected with the output terminal of the first inductor (150), and a second end connected in short circuit with the DC tension source (110), and a piloting head connected with a driver (160),
a third capacitor (165) connected in series with the first inductor (150) and in parallel with the active switch (155), the output terminal of said further capacitor (165) being connected in short circuit with the DC tension source (110), via an electrical branch to which the active switch (155) and the second isolation capacitor (130) are also connected.

13. The apparatus (100) of claim 12, wherein the converter means (135) comprise a second inductor (170) connected in series with both the first inductor (150) and the first isolation capacitor (125), and connected in parallel with both the active switch (155) and the third capacitor (165).

14. The apparatus (100) of claim 10, wherein the reactive circuit (145) is configured as a passband filter for the electric tension wave, and is set up so as to pass one or more of the fundamental frequencies of the electric tension wave chosen among the group constituted by: the first fundamental frequency of the electric tension wave, the third fundamental frequency of the electric tension, or other odd harmonics of a higher order.

15. The apparatus (100) of claim 10, comprising control means (160) for controlling the electrical pilot signal, the control means being configured for:
suspending the generating of the electrical pilot signal, such as to prevent one or more consecutive switching on and off cycles of the active switch (155).

16. The apparatus of claim 15, wherein the control means are configured such as:
measuring, using appropriate sensors, an electric parameter characteristic of the electric power transferred to the electrical load (105),
calculating the difference between the measurement of the electrical parameter characteristic of the electric power and the predetermined reference value, and
regulating the number and/or the frequency of switching-on and off cycles which are inhibited, such as to minimize the difference.

17. The apparatus (100) of claim 10, comprising:
means (185, 190) for temporarily deviating the electric tension wave onto an electrical line in parallel to the electrical load (105)
wherein the means for deviating the electric tension wave comprise a second active switch (190), a third electric capacitor (185) arranged in series to the second active switch (190) along the electric line, and means for generating an electrical pilot signal for switching on and off the second active switch (190) alternatingly, the third electric capacitor (185) having a sufficiently high value to be considered as a short circuit with respect to the electrical load (105), when the second active switch is on.

18. The apparatus of claim 17, comprising a control circuit configured for:
measuring an electric parameter characteristic of the electric power transferred to the electrical load (105), calculating the difference between the measurement of the electric parameter characteristic of the electric power and the predetermined reference value, and regulating the duty-cycle of the electric pilot signal of the second active switch, such as to minimize the difference.

19. The apparatus (100) of claim 10, comprising:
means (200) for regulating the direct electric tension.

20. The apparatus (100) of claim 10, comprising:
means (111) for rectifying an alternating electrical current in order to obtain the direct electric tension.

21. The apparatus (100) of claim 10, wherein each of the capacitors (125, 130) is a pre-assembled component, and wherein the capacitors (125, 130) are installed in a same device (250).

22. The apparatus (100) of claim 10, comprising a user device (305) and a supply device (300) separate and independent of the user device (305), wherein the user device (305) comprises a first armature (320) of each of the capacitors (125, 130), while the supply device (300) comprises the second armature (320) of each of the capacitors (125, 130).

\* \* \* \* \*